United States Patent
Haavisto et al.

[11] Patent Number: 5,915,239
[45] Date of Patent: Jun. 22, 1999

[54] VOICE-CONTROLLED TELECOMMUNICATION TERMINAL

[75] Inventors: Petri Haavisto; Kari Laurila; Markku Majaniemi, all of Tampere, Finland

[73] Assignee: Nokia Mobile Phones Ltd., Espoo, Finland

[21] Appl. No.: 08/918,386

[22] Filed: Aug. 26, 1997

[30] Foreign Application Priority Data

Sep. 2, 1996 [FI] Finland ................................. 963417

[51] Int. Cl.⁶ ........................... G10L 9/00; H04M 1/27
[52] U.S. Cl. ........................................ 704/275; 704/270
[58] Field of Search ................................ 704/270, 275; 379/67, 354, 355, 88, 216

[56] References Cited

U.S. PATENT DOCUMENTS

| | | | |
|---|---|---|---|
| 4,644,107 | 2/1987 | Clowes et al. | 379/354 |
| 4,853,953 | 8/1989 | Fujisaki | 379/88 |
| 4,928,302 | 5/1990 | Kaneuchi et al. | 379/88 |
| 4,945,557 | 7/1990 | Kaneuchi et al. | 379/67 |
| 5,182,765 | 1/1993 | Ishii et al. | 379/88 |
| 5,222,121 | 6/1993 | Shimada | 379/88 |
| 5,640,485 | 6/1997 | Ranta | 395/2.6 |

*Primary Examiner*—David R. Hudspeth
*Assistant Examiner*—Susan Wieland
*Attorney, Agent, or Firm*—Perman & Green, LLP

[57] ABSTRACT

A method for selecting a telephone number by means of voice control, the telephone numbers which can be selected are stored, and for each telephone number which can be selected at least one identifier, such as a name is stored. In the storing phase, the identifier is pronounced and divided into one or several sub-identifiers, which are stored, and to which information on the telephone number is linked, wherein the telephone number mentioned in the selecting phase can be dialed either by pronouncing said sub-identifiers in any order according to a combination or partial combination of the sub-identifiers.

13 Claims, 3 Drawing Sheets

VOICE-CONTROLLED TELECOMMUNICATION TERMINAL

BACKGROUND OF THE INVENTION

The present invention relates to a method for controlling a telecommunication terminal by means of voice, as presented in the preamble of the claim 1, and a voice-controlled telecommunication terminal according to the method.

When a mobile phone is used in a car, a hands-free mode is often required, wherein the car has a hands-free equipment for the mobile phone, comprising a separate loudspeaker and a microphone. Thus, the speaker can use both hands for driving during the call. The advantages of the hands-free mode are comfort in use and improved safety. To increase comfort in use, the hands-free mode is used also in offices as a desktop hands-free installation.

The convenience of hands-free mode is decreased by the fact that for making a call the driver has to dial the telephone number by pressing the keys of the phone. This impairs traffic safety, because the look of the driver is attached to the phone. To facilitate the dialing of numbers, shortcut functions have been designed to phones, wherein names and numbers of persons have been stored into the memory of the phone. The shortcut memory can be scrolled through, wherein it is advantageous to show on the display device of the phone an identifier corresponding to each telephone number, such as the name of the respective person. If needed, it is also possible to show the phone number corresponding to the identifier. The memory can be scrolled forwards and backwards, and when the desired identifier appears on the display device, the dialing the phone number can be started, for example by pressing a call key. However, the shortcut function does not entirely eliminate the need to press the keys when calling.

Various methods based on voice recognition for telecommunication terminals, such as mobile phones and wireline telephones, have been developed, particularly for dialling a phone number without pressing the keys. In such methods, the desired phone number can be dialed usually in a manner that the caller pronounces the phone number or an identifier related to the phone number, such as the name of the person. The phone number corresponding to the identifier has been stored advantageously to the shortcut memory.

Some known telecommunication terminals and methods based on voice recognition have been described in the patent publications U.S. Pat. No. 4,644,107, U.S. Pat. No. 4,853, 953, U.S. Pat. No. 4,928,302, U.S. Pat. No. 5,182,765 and U.S. Pat. No. 5,222,121.

Prior art control and calling methods of a telecommunication terminal using voice recognition are mainly based on the fact that a distinguishing voice pattern has been stored for each command and phone number. Thus, the command or identifier has to be given in a form as identical with the stored form as possible. Thus, the caller has to remember in which form e.g. the name "Matthew Herbert Williams" was stored; was it stored exactly in this form, or in form "Matthew Williams", "Williams Matthew", or "Williams Matthew Herbert".

U.S. Pat. No. 5,222,121 discloses a voice-recognition dialing device arranged in connection with a telephone mounted on a vehicle or the like. Into the memory of the dialing device, voice patterns corresponding to the commands and telephone numbers, such as words "RECALL MEMORY", "SEND" and "VERIFY", are stored. Voice patterns are preferably stored already when the dialing device is manufactured. The dialing unit can also be implemented in a manner that the user teaches the unit also the commands and numbers. The dialing device includes a loudspeaker and/or a display device, wherein the user is given instructions in form of voice signals and/or text. The call is initiated by pronouncing the command "RECALL MEMORY", wherein the dialing device requests the user to pronounce the identifier of the desired telephone number. After the identifier has been pronounced, the device compares the identifiers stored into the memory and after finding an identifier that most resembles the pronounced identifier, it gives a voice signal. The user may then give the device a call command "SEND", or a command "VERIFY" if the user wishes to check that the number is correct. In this case, the dialing device informs the chosen identifier, for example in a sound signal. If the chosen identifier is correct, a connection is created by using a call command. If the chosen identifier is incorrect, the user can scroll through the other alternatives by using a command "NEXT ONE". However, the identifiers have to be given in the same form as they have been stored, which increases the possibility of false choices.

U.S. Pat. No. 4,928,302 presents another dialing device for calling a desired telephone number by using voice commands. In this device, the telephone numbers can be classified for example according to the initial part of the name. The search can thus be implemented by pronouncing for example the surname "Williams", wherein the device searches all the names having "Will" in their initial part, such as "Williams", "Williamson" and "Willis". In the next phase the desired name can be chosen from the list formed by the device, which is thus in this phase briefer than the list of all the names stored in the memory. Even this device has the disadvantage that the user has to remember the form the name was stored, that is, "Williams Matthew", "Matthew Williams", "Williams Matthew Herbert" or "Matthew Herbert Williams",

SUMMARY OF THE INVENTION

The purpose of the present invention is to eliminate the above mentioned disadvantages to a great extent and to provide a device and method for controlling a telecommunication terminal by means of voice command, particularly for choosing a telephone number from a group of stored telephone numbers. The invention is based on the idea that the identifier can comprise more than one sub-identifier, i.e. word, wherein in the search phase the identifier can be dictated according to combination of any sub-identifiers. The method of the invention is characterized in what is said in the characterizing portion of the appended claim 1. The voice-controlled unit of the invention is characterized in what is said in the characterizing portion of the appended claim 3.

The present invention provides significant advantages over prior art voice-control methods and voice-controlled devices.

In the method according to the invention the identifier related to a telephone number can be composed of one or several sub-identifiers stored into the memory of the device. However, it is not required in the calling phase to pronounce the sub-identifiers in the exact order as they were stored, but any combination or partial combination of sub-identifiers can be used. It is not even necessary to pronounce all the sub-identifiers provided that the telephone number to be chosen is identified by the group of the pronounced sub-identifiers. In some cases the identifier can be identified by pronouncing just one sub-identifier.

A method in accordance with a second advantageous embodiment of the invention provides the option to pronounce sub-identifiers not present in the group of sub-identifiers stored in the memory, that is the word list, when the telephone number is chosen. The voice-recognition advantageously ignores these sub-identifiers and performs the selection based on sub-identifiers present in the word list.

BRIEF DESCRIPTION OF THE DRAWINGS

In the following, the invention is described in more detail with reference to the accompanying drawing, where.

DETAILED DESCRIPTION OF THE INVENTION

Figure 1:
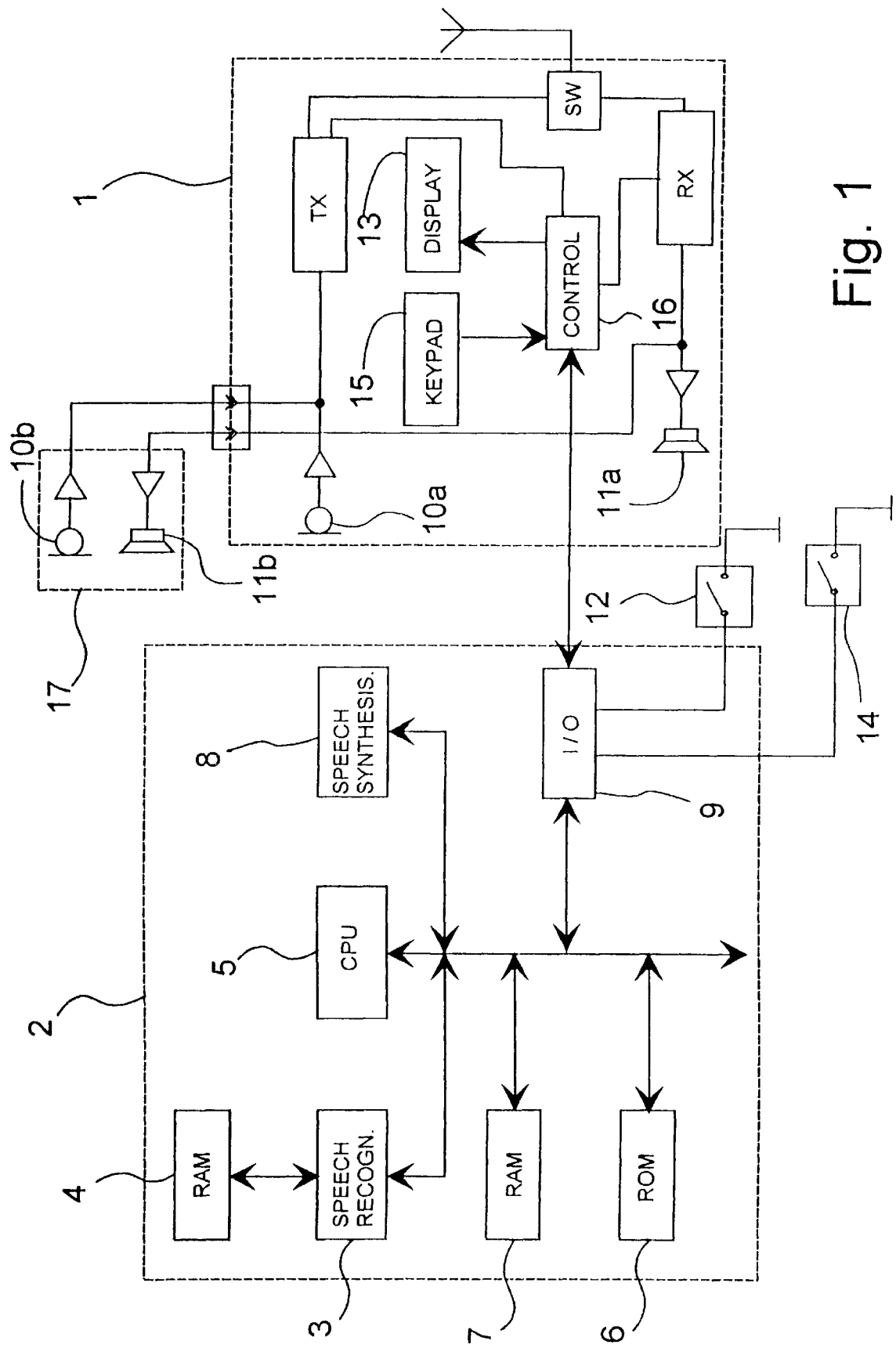
FIG. 1 shows a reduced block diagram of one advantageous dialling device according to the invention.

A voice-controlled telecommunication terminal 1 according to an advantageous embodiment of the invention as shown in FIG. 1 is for example a mobile station, such as a GSM mobile phone, or a fixed wireline telephone. FIG. 1 shows only those blocks which are the most essential for understanding the invention. A voice-control unit 2 comprises advantageously a voice-recognition means 3, a voice pattern memory 4, a controller unit 5, read-only memory 6, random access memory 7, speech synthesiser 8 and a interface 9. Voice control can be given e.g. by means of a microphone 10a of the telecommunication terminal 1 or by means of a microphone 10b of a hands-free equipment 17. The instructions and notices to the user can be given e.g. by means of sound signals created by a speech synthesizer 8 either through a loud-speaker 11a belonging to the telecommunication terminal 1 or through a loudspeaker 11b of the hands-free equipment. The voice-control unit 2 of the invention can also be implemented without the voice-synthesizer 8, wherein instructions and notices are transmitted to the user preferably in text form on the display means 13 of the telecommunication terminal. Another option is to transmit instructions and notices to the user both as sound and as text messages.

In the following, the operation of the method and the telecommunication device 1 in accordance with the invention is described. Before the voice-control operates, the device has to be taught usually all the voice commands and identifiers to be used. It is preferable that the voice commands have been taught in the manufacturing phase of the device, wherein the user teaches only those identifiers he or she will need. This can be implemented e.g. by setting the voice-control unit 2 to a teach mode, for example by keying the voice-storing key A of the keyboard 15 of the telecommunication terminal 1, by keying the supplementary voice-storing key 12 or through the menu facility of the telecommunication terminal 1. The manner how the changing over to the teach mode of the voice commands is implemented depends e.g. on the telecommunication terminal 1 used and on the implementation of the voice control and its technology known by an expert in the field as such. Subsequently, the user pronounces the command taught at a time and advantageously by pressing the keys informs which command was pronounced. If required, the command is repeated several times to ensure reliable storing as to the voice recognition. According to the pronounced command, the voice-recognition means 3 forms an identifier, which is stored to the voice pattern memory 4. Prior art includes several alternative implementations for voice-recognition means 3 and voice-equivalent memory 4 and they are known by an expert in the field. Thus, a more detailed description of these implementations is unnecessary in this context; instead reference is made for example to the publications mentioned in connection with the description of prior art.

Also the numerals from zero to nine are advantageously stored into the voice-equivalent memory, wherein the user can store also the telephone number by pronouncing it, wherein the voice-control unit 2 transforms the pronounced telephone number preferably to signals corresponding to the numeral keys and stores the information on the telephone number to the telephone number memory, wherefrom it can be collected when calling. The user can give the telephone number also by keying in the corresponding numerals. The teach mode of the voice commands is terminated advantageously by keying again the voice-store key A or through the menu function of the telecommunication terminal.

Figure 2:
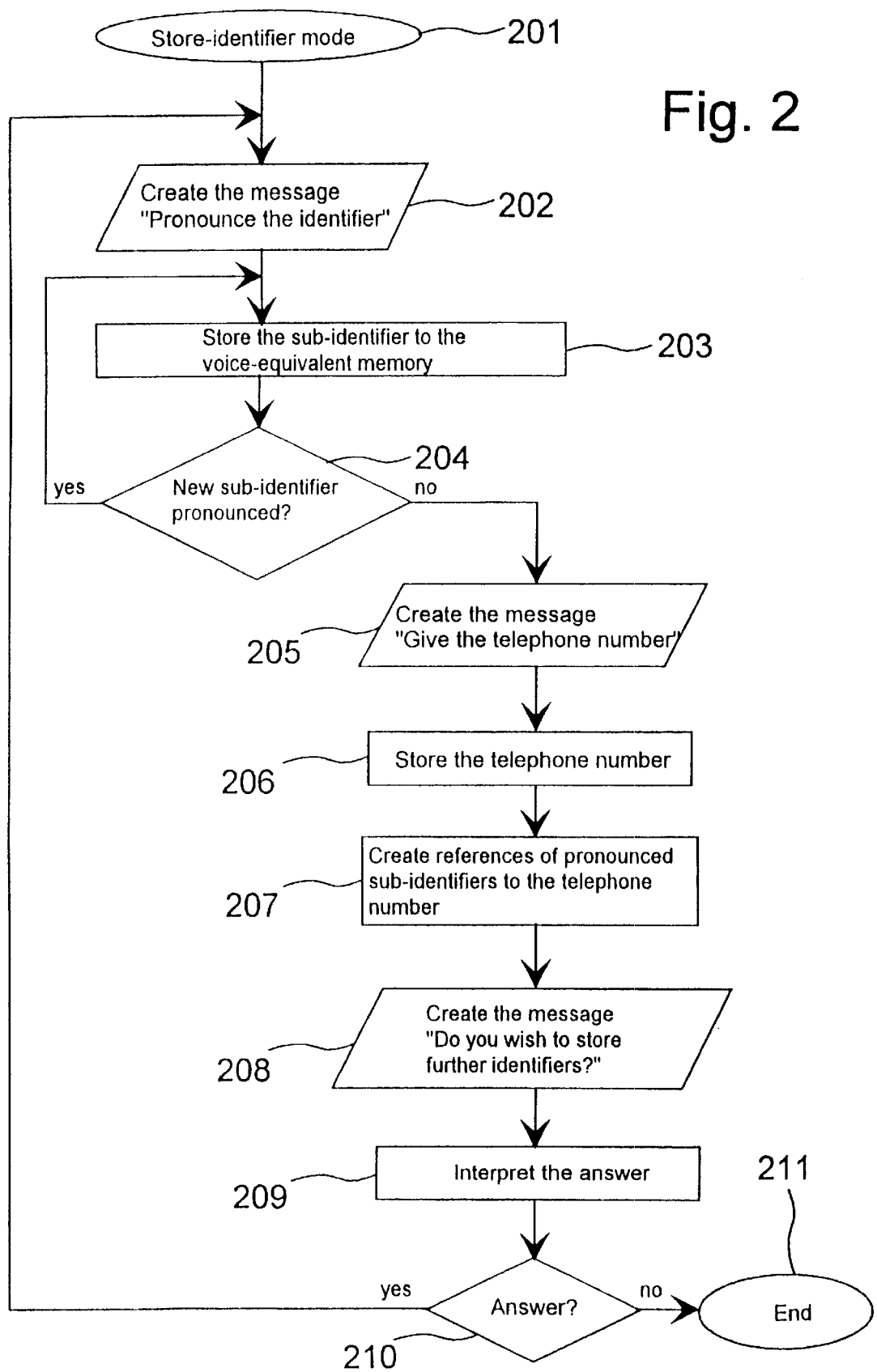
FIG. 2 shows a reduced flow chart of storing of an identifier into the memory of the device.

In the phase when the user wishes to store the identifier of the telephone number, the voice-control unit 2 is set to a mode in which the voice-control unit can expect to receive identifiers, which can be composed of one or several sub-identifiers. This function mode is described in the following with reference to the flow chart of FIG. 2. Changing over to the store-identifier mode (block 201) is implemented advantageously by keying the voice-store key A or through the menu facility, as presented earlier in connection with command storing. The voice-recognition unit 2 creates advantageously a message "Pronounce the identifier" (block 202), wherein the user starts pronouncing the sub-identifiers of the identifier. Thus, the identifier can comprise one or several sub-identifiers, for example "Williams", "Matthew", "Herbert". A short pause is kept between each sub-identifier, wherein the voice-recognition unit 2 is able to separate the sub-identifiers from each other. Each pronounced sub-identifier is stored into the voice-equivalent memory 4 (block 203). The voice-control unit 2 can additionally create a short sound signal (e.g. a bleep) after each pronounced sub-identifier as a sign that the sub-identifier is stored. Subsequently, after all the sub-identifiers have been pronounced (block 204), the user is requested to give the telephone number related to the identifier (block 205), e.g. by pronouncing the numbers or by keying. After the number has been given, the voice-control unit 2 stores the telephone number e.g. to the random access memory 7 (block 206) and creates references of the sub-identifiers to the telephone number (block 207). Subsequently, the user is asked whether any other identifiers and telephone numbers are to be stored (blocks 209, 210). In case the user wishes to continue the storing, the function moves back to the block 202 until identifiers are no longer given (block 211).

Division into sub-identifiers can also be implemented in a manner that the user divides the identifier into sub-identifiers and separates the sub-identifiers e.g. by pressing a key.

In the calling phase the voice-control unit 2 has to be set to a choose-name mode, e.g. by a voice command "phone call" or by using the keys of the telecommunication terminal 1. When mounted on a car, it is also possible to bring a supplementary control option, external from the telecommunication terminal 1, e.g. close to the steering wheel of the car, wherein the activation of the choose-name mode is easy to implement, e.g. by an activation switch 14. In the following, the voice-controlled dialling of telephone number in accordance with a preferred embodiment of the invention is described with reference to the flow chart of FIG. 3.

After the voice-control unit 2 has recognised the given command as the activation command of the choose-name mode, the voice-control unit 2 moves to a choose-telephone-number mode (block 301). The voice-control unit 2 creates advantageously a sound signal to the loud-speaker 11 and/or a text message on a display means 13, which signal or message informs the user to pronounce the identifier (block 302). The user can pronounce the sub-identifiers of the identifier in any order, preferably by keeping a short pause between sub-identifiers to separate the sub-identifiers from each other. The voice-control unit 2 calculates the probability between the first stored identifier and the pronounced identifier (block 303). Subsequently, it is examined whether any other identifiers are stored into the memory (block 304). In case there remains any non-examined identifiers, probability is created for the next identifier (block 305). When probability has been created for every stored identifier, the highest calculated probability is searched. In case the probability calculated to one stored identifier is distinctively higher than that calculated to the rest of the identifiers, it can be assumed that the said identifier is the correct one (block 306), wherein choose-telephone-number mode can be started (block 307). In case the identifying of the identifier did not succeed, it is possible e.g. to move back to the block 302 and ask the user to repeat the identifier until the selection can be identified.

Figure 3:
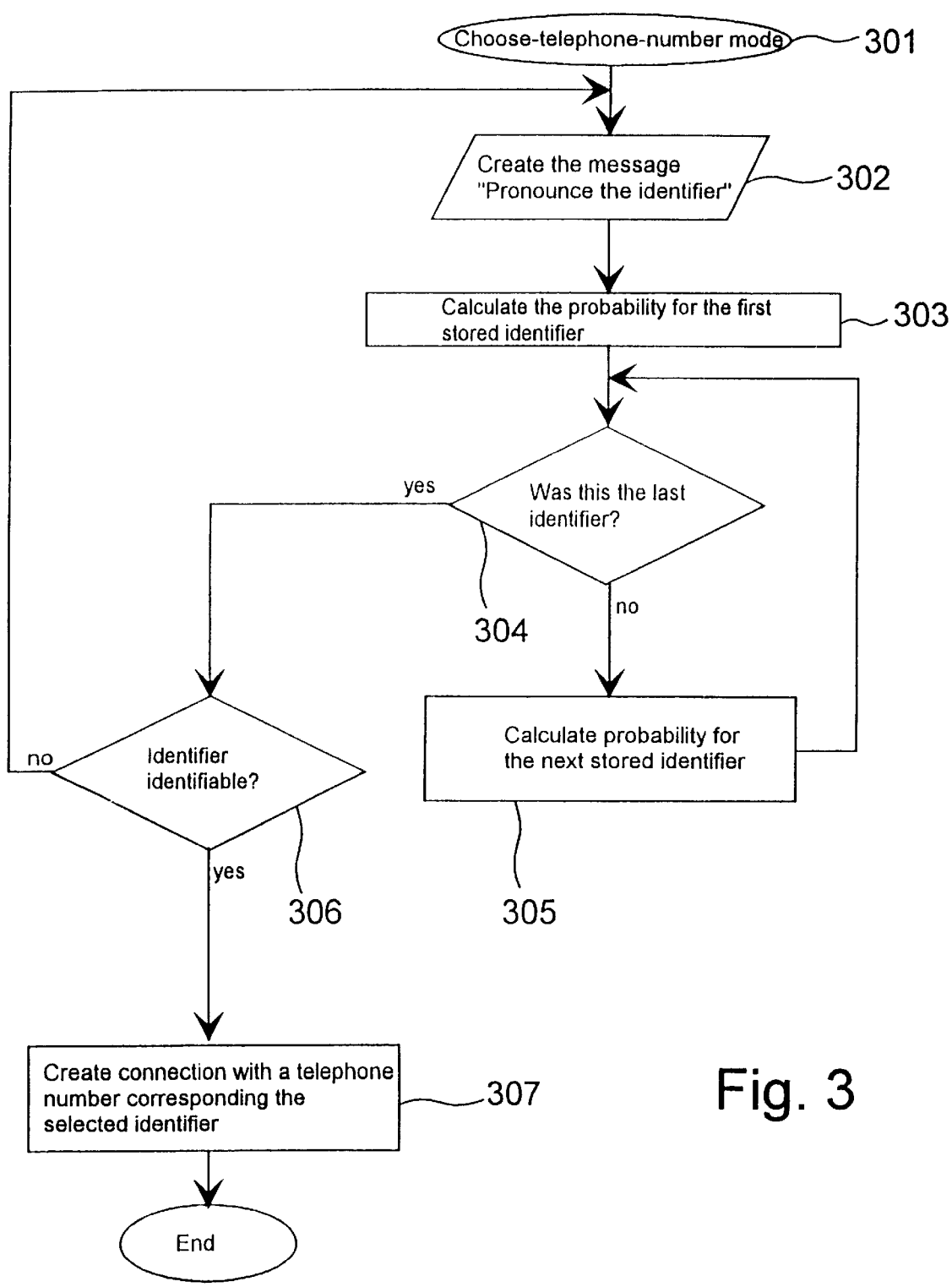
FIG. 3 shows a reduced flow chart of a situation in which a telephone number is dialled in accordance with one advantageous embodiment of the invention.

A complete identification is not always reached, wherein the voice-control unit 2 can inform the user and to ask the user to pronounce the identifier again, e.g. by moving back to block 302 in the flow chart of FIG. 3. The voice control unit 2 can also create e.g. a sound signal of those identifiers that according to the comparison made by the voice-recognition means 3 most resemble the pronounced identifier, wherein the user can select the correct identifier. In case none of the proposed identifiers is correct, the user can repeat the identifier. Even if the voice-control unit 2 could recognize the given identifier, it is preferable to verify from the user that the selected identifier is correct. This can be performed for example in a manner that the user gives a dial command if the identifier is correct, or a re-recognition command if the identifier is incorrect. The verifying can be advantageously performed also by an activation switch key 14. Yet another alternative for verifying is that the telecommunication terminal 1 will wait a predetermined time for the command of the user, and in case no command is coming, it presumes the selected telephone number to be correct and starts the dialling.

The telephone number is dialled according to the information stored to the telephone number memory in a manner known as such. The used memory can be memory of the telecommunication terminal 1 (not shown) or the random access memory 7 of the voice-control unit 2. Also non-volatile random access memory (NVRAM) can be partially used as the random access memory 7 of the voice-control unit 2, wherein the information stored in the memory is preserved also without operating voltage.

The method according to the invention can be implemented e.g. in a manner that in the storing phase a separate model is formed of each pronounced identifier. In the following, it is assumed that N number of names, that is sub-identifiers: $n_1, n_2, \ldots n_N$, is related to the telephone number. For the recognition phase, a model structure is formed to the telephone number, the structure including every possible sub-identifier composition, that is, 1 to N sub-identifiers in every possible order.

These sub-identifier compositions include $$\sum_{i=1}^{N} i! \cdot \binom{N}{i} \text{ pcs.}$$

The voice-control unit 2 defines probability to all the sub-identifier compositions, and the sub-identifier composition which is given the highest probability is the final result of the recognition.

For example in the case $n_1$=Williams, $n_2$=Matthew and $n_3$=Herbert, the possible sub-identifier compositions are:

Williams, Matthew, Herbert, Williams Matthew, Matthew Williams, Williams Herbert, Herbert Williams, Matthew Herbert, Herbert Matthew, Williams Matthew Herbert, Williams Herbert Matthew, Matthew Williams Herbert, Matthew Herbert Williams, Herbert Williams Matthew, and Herbert Matthew Williams Thus, there are altogether 15 possible sub-identifier compositions when the number of the sub-identifiers is three. Sub-identifier combinations are thus full combinations of sub-identifiers (consisting all the sub-identifiers) or partial combinations of sub-identifiers (consisting only a part of the sub-identifiers). Also partial combinations having only one sub-identifier are possible when adapting the voice control according to the invention.

The following Table 1 shows the number of sub-identifier combinations as the function of sub-identifiers.

| Number of sub-identifiers | Number of sub-identifier combinations |
|---|---|
| 1 | 1 |
| 2 | 4 |
| 3 | 15 |

As it can be seen in the Table 1, the number of sub-identifier combinations rises very quickly, it being as high as 64 when the number of the sub-identifiers is four. The quantity of the memory and the calculation time required for storing the model structure can be diminished by means of the implementation alternative according to the preferred embodiment of the invention. In this alternative, separate sub-identifiers are recognised, these being independent from each other, from the group of all the pronounced words (word spotting). In this method, it looks as if the voice-control unit 2 is constantly waiting for a certain sub-identifier and it recognizes whether it is pronounced or not. In this case, the voice-control unit 2 produces several possible alternative names and a probability rank for them. According to these alternatives, the telephone number meant by the user can be concluded.

In this method, it does not make a difference how many words not included in the word list (the group of all the stored sub-identifiers) are used, which makes this method highly flexible in use.

In the teaching phase, the voice-control unit 2 transforms the pronounced sub-identifiers to a form appropriate for storing and compares each pronounced sub-identifier to ready-stored sub-identifiers. In case the pronounced sub-identifier had already been stored; e.g. the user has already stored the name "Matthew Taylor", the voice-control unit 2 detects, when "Matthew" is being pronounced, that this had already been stored. In this case, the voice-control unit 2 forms a reference from the sub-identifier "Matthew" to the telephone number of Taylor and the telephone number of Williams. In this situation, in the recognition phase, after the sub-identifier "Matthew", the voice-control unit 2 has formed e.g. a list which includes both Matthew Taylor and Matthew Williams. Thus, the voice-control unit 2 knows to expect either Taylor or Williams, and after the user has pronounced the next sub-identifier, the voice-control unit 2 judges whether the identifier can be identified on basis of the given sub-identifiers or whether it should wait for a possible sub-identifier to come. This could be possible in such cases when the two sub-identifiers are identical and the third sub-identifier is different. Although the above mentioned sub-identifiers comprise only the surnames and forenames of persons, the sub-identifiers can denote e.g. to the name of the company or group where the person in question is working, or possibly also to the department or filial name ("Matthew", "Williams", "Nokia", "Mobile Phones"). Further, the person may have several telephone numbers, even in different countries, wherein one used sub-identifier can be a country ("Matthew", "Williams", "Nokia", "Finland"). Also the home number can be distinguished by using e.g. a sub-identifier "Home".

The voice-control unit 2 according to the invention is preferably formed to constitute a part of the telecommunication terminal 1, wherein the functions of the voice-control unit are included advantageously in the functional software and apparatus of the telecommunication terminal 1. Thus, the used controller unit 5, read-only memory 6 and random access memory 7 are the corresponding parts of the telecommunication terminal. In order to simplify this in FIG. 1, these parts are shown in a control block 16.

Another alternative to implement the telecommunication terminal 1 according to the invention is to form a part of the blocks in the voice-control unit 2 in connection with the telecommunication terminal 1 and in a manner that a part of the blocks is e.g. a separate device.

Most mobile stations include an access gate for the possibility of connecting external auxiliary devices, wherein the voice-control unit 2 can be implemented as a separate auxiliary device connected to the access gate. Thus, the dialling signals of the control and telephone number can be transmitted via the connectors of the access gate, which is known technology as such.

Yet another alternative to implement the voice-control unit is to form a voice-control service in a telecommunication network, such as mobile communication network, in which voice-control service the functions of the voice-control unit are situated. Thus, the voice recognition is selected e.g. through the menu functions of the mobile station, wherein a voice connection is formed from the mobile station to the voice-control service. Subsequently, the recognition is advantageously performed, as described above. After the identifier has been identified, the voice-control service is capable of creating a connection to the telephone number corresponding to the identifier.

The invention is not restricted solely to the examples presented above but it can be modified within the scope of the accompanying claims.

What is claims is:

1. A method for selecting a telephone number by means of voice control, in which method the telephone numbers which can be selected are stored, and an identifier is stored for each telephone number which can be selected, wherein in the storing phase the identifier is pronounced and divided into several sub-identifiers, which are stored and to which information of the telephone number is linked, wherein the method comprises selecting the telephone number from all combinations of sub-identifiers in response to a voice command comprising the sub-identifier.

2. A method for selecting a telephone number by means of voice control, in which method the telephone numbers which can be selected are stored, and an identifier is stored for each telephone number which can be selected, wherein, in the storing phase the identifier is pronounced and divided into several sub-identifiers, which are stored and to which information of the telephone number is linked, wherein the method comprises selecting the telephone number in response to a voice command comprising a combination of several sub-identifiers.

3. A method as set forth in claim 1, characterized in that the identifier is a name of a person, wherein the used sub-identifiers are preferably the surname of the person and one or several forenames of the person.

4. A voice controlled device comprising:

means for storing the telephone numbers to be selected, means for storing at least one identifier for each telephone number to be selected, means for receiving an identifier given in a voice form, means for interpreting the received voice commands, means for selecting a telephone number in response to a voice command, wherein the identifier comprises a plurality of sub-identifiers, and the voice controlled device comprises means for storing the sub-identifiers, and means for selecting a telephone number in response to a voice command comprising at least two of the plurality of sub-identifiers including the sub-identifier.

5. A voice controlled device as set forth in claim 4 wherein the voice controlled device is formed to constitute a separate device.

6. A voice controlled device as set forth in claim 4 wherein the voice controlled device is arranged to be used in connection with a telecommunication terminal.

7. A voice controlled device as set forth in claim 4 intended to be used in call formation in a telecommunication network, such as a mobile communication network, wherein the voice controlled device is located in the telecommunication network.

8. A voice controlled device as set forth in claim 4 wherein the voice controlled device is formed to constitute a part of a telecommunication terminal.

9. A voice controlled device as set forth in claim 8 wherein the telecommunication terminal is a mobile station, such as a Global System for Mobile Communications (GSM) mobile-station.

10. A voice controlled device comprising:

means for storing telephone numbers to be selected, means for storing at least one identifier for each telephone number to be selected, means for receiving an identifier given in a voice form, means for interpreting received voice commands, means for selecting a telephone number in response to a voice command, wherein the identifier comprises several sub-identifiers, and the voice controlled device comprises means for storing the sub-identifiers, and means for selecting a telephone number in response to a voice command comprising a combination of several sub-identifiers.

11. A voice controlled device comprising:

means for storing telephone numbers to be selected, means for storing at least one identifier for each telephone number to be selected, means for receiving an identifier given in a voice form, means for interpreting received voice commands, means for selecting a telephone number in response to a voice command, wherein the identifier comprises at least one sub-identifier, and the voice controlled device comprises means for storing the sub-identifier, and means for selecting a telephone number in response to a voice command comprising the sub-identifier, and the identifier is arranged to be divided into sub-identifiers in the voice controlled device automatically, preferably on the basis of pauses kept between the sub-identifiers when pronouncing the sub-identifiers.

12. A voice controlled device comprising:

means for storing telephone numbers to be selected, means for storing at least one identifier for each telephone number to be selected, means for receiving an identifier given in a voice form, means for interpreting received voice commands, means for selecting a telephone number in response to a voice command, wherein the identifier comprises at least one sub-identifier, and the voice controlled device comprises means for storing the sub-identifier, means for selecting a telephone number in response to a voice command comprising the sub-identifier, and means for giving commands to the voice controlled device, wherein, the identifier is arranged to be divided into sub-identifiers by using means for giving commands to the voice controlled device.

13. A method for selecting a telephone number by means of voice control, in which method the telephone numbers which can be selected are stored, and an identifier is stored for each telephone number which can be selected, wherein at the storing phase the identifier is pronounced and divided into several sub-identifiers, which are stored and to which information of the telephone number is linked, wherein the method comprises selecting the telephone number from a plurality of sub-identifiers uttered in any order by a voice command, the plurality of sub-identifiers including said sub-identifier.

* * * * *

(12) EX PARTE REEXAMINATION CERTIFICATE (8803rd)
United States Patent
Haavisto et al.

(10) Number: US 5,915,239 C1
(45) Certificate Issued: Jan. 17, 2012

(54) VOICE-CONTROLLED TELECOMMUNICATION TERMINAL

(75) Inventors: Petri Haavisto, Tampere (FI); Kari Laurila, Tampere (FI); Markku Majaniemi, Tampere (FI)

(73) Assignee: Mobilemedia Ideas LLC, Chevy Chase, MD (US)

Reexamination Request:
No. 90/011,620, Apr. 5, 2011

Reexamination Certificate for:
Patent No.: 5,915,239
Issued: Jun. 22, 1999
Appl. No.: 08/918,386
Filed: Aug. 26, 1997

(51) Int. Cl.
*H04M 1/27* (2006.01)

(52) U.S. Cl. ........................ 704/275; 704/270
(58) Field of Classification Search .................. 704/275
See application file for complete search history.

(56) References Cited

To view the complete listing of prior art documents cited during the proceeding for Reexamination Control Number 90/011,620, please refer to the USPTO's public Patent Application Information Retrieval (PAIR) system under the Display References tab.

*Primary Examiner* — Christina Y Leung

(57) ABSTRACT

A method for selecting a telephone number by means of voice control, the telephone numbers which can be selected are stored, and for each telephone number which can be selected at least one identifier, such as a name is stored. In the storing phase, the identifier is pronounced and divided into one or several sub-identifiers, which are stored, and to which information on the telephone number is linked, wherein the telephone number mentioned in the selecting phase can be dialed either by pronouncing said sub-identifiers in any order according to a combination or partial combination of the sub-identifiers.

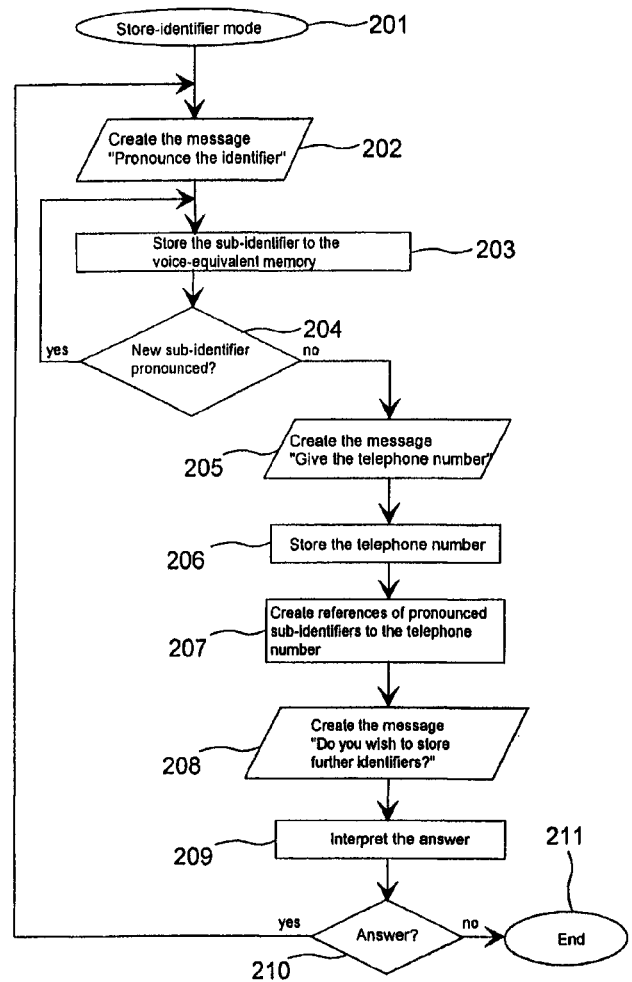

US 5,915,239 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-10 and 13 is confirmed.

Claims 11 and 12 are determined to be patentable as amended.

Claims 14-46 are added and determined to be patentable.

11. [A] *The* voice controlled device [comprising:
  means for storing telephone numbers to be selected,
  means for storing at least one identifier for each telephone number to be selected,
  means for receiving an identifier given in a voice form,
  means for interpreting received voice commands,
  means for selecting a telephone number in response to a voice command,
  wherein the identifier comprises at least one sub-identifier, and the voice controlled device comprises means for storing the sub-identifier, and means for selecting a telephone number in response to a voice command comprising the sub-identifier, and] *of claim 10, wherein*
  the identifier is arranged to be divided into sub-identifiers in the voice controlled device automatically, preferably on the basis of pauses kept between the sub-identifiers when pronouncing the sub-identifiers.

12. [A] *The* voice controlled device *of claim 10, further* comprising: [
  means for storing telephone numbers to be selected,
  means for storing at least one identifier for each telephone number to be selected,
  means for receiving an identifier given in a voice form,
  means for interpreting received voice commands,
  means for selecting a telephone number in response to a voice command, wherein the identifier comprises at least one sub-identifier, and the voice controlled device comprises means for storing the sub-identifier,
  means for selecting a telephone number in response to a voice command comprising the sub-identifier, and]
  means for giving commands to the voice controlled device, wherein, the identifier is arranged to be divided into sub-identifiers by using means for giving commands to the voice controlled device.

*14. The method of claim 1, wherein the method is implemented in a mobile telephone including a memory, and wherein the step of selecting the telephone number comprises selecting the telephone number from all combinations of sub-identifiers stored in the memory in response to a voice command comprising the sub-identifier matching one of the sub-identifiers stored in the memory.*

*15. The method of claim 14, wherein the step of selecting the telephone number ignores words in the voice command that do not match any of the sub-identifiers stored in the memory.*

*16. The method of claim 2, wherein the method is implemented in a mobile telephone including a memory, and wherein the step of selecting the telephone number comprises selecting the telephone number in response to a voice command comprising a combination of several sub-identifiers each matching one of the sub-identifiers stored in the memory.*

*17. The method of claim 16, wherein the step of selecting the telephone number ignores words in the voice command that do not match any of the sub-identifiers stored in the memory.*

*18. A voice controlled device as set forth in claim 4, wherein the voice controlled device is a mobile telephone.*

*19. A voice controlled device as set forth in claim 4, wherein the voice controlled device is a GSM mobile telephone.*

*20. A voice controlled device as set forth in claim 10, wherein the voice controlled device is formed to constitute a separate device.*

*21. A voice controlled device as set forth in claim 10, wherein the voice controlled device is arranged to be used in connection with a telecommunication terminal.*

*22. A voice controlled device as set forth in claim 10 intended to be used in a telecommunication network, wherein the voice controlled device is located in the telecommunication network.*

*23. A voice controlled device as set forth in claim 10 intended to be used in a mobile telecommunication network, wherein the voice controlled device is located in the mobile telecommunication network.*

*24. A voice controlled device as set forth in claim 10, wherein the voice controlled device is formed to constitute a part of a telecommunication terminal.*

*25. A voice controlled device as set forth in claim 24, wherein the communication terminal is a mobile station.*

*26. A voice controlled device as set forth in claim 24, wherein the communication terminal is a GSM mobile station.*

*27. A voice controlled device as set forth in claim 10, wherein the voice controlled device is a mobile telephone.*

*28. A voice controlled device as set forth in claim 10, wherein the voice controlled device is a GSM mobile telephone.*

*29. A voice controlled device as set forth in claim 11, wherein the voice controlled device is a mobile telephone.*

*30. A voice controlled device as set forth in claim 11, wherein the voice controlled device is a GSM mobile telephone.*

*31. A voice controlled device as set forth in claim 11, wherein the device divides the identifier into sub-identifiers automatically in response to the voice form of the identifier.*

*32. A voice controlled device as set forth in claim 31, wherein the voice controlled device is a mobile telephone.*

*33. A voice controlled device as set forth in claim 31, wherein the voice controlled device is a GSM mobile telephone.*

*34. A voice controlled device as set forth in claim 11, wherein the device divides the identifier into sub-identifiers automatically on the basis of pauses between the sub-identifiers when pronouncing the sub-identifiers.*

*35. A voice controlled device as set forth in claim 34, wherein the voice controlled device is a mobile telephone.*

*36. A voice controlled device as set forth in claim 34, wherein the voice controlled device is a GSM mobile telephone.*

37. A voice controlled device as set forth in claim 12, wherein the voice controlled device is a mobile telephone.

38. A voice controlled device as set forth in claim 12, wherein the voice controlled device is a GSM mobile telephone.

39. A voice controlled device as set forth in claim 12, wherein the means for giving commands to the voice controlled device includes a user-activated device, and wherein the identifier is separated into sub-identifiers in response to activating the user-activated device.

40. A voice controlled device as set forth in claim 39, wherein the voice controlled device is a mobile telephone.

41. A voice controlled device as set forth in claim 39, wherein the voice controlled device is a GSM mobile telephone.

42. A voice controlled device as set forth in claim 39, wherein the user-activated device is a key, and wherein the identifier is separated into sub-identifiers in response to pressing the key.

43. A voice controlled device as set forth in claim 42, wherein the voice controlled device is a mobile telephone.

44. A voice controlled device as set forth in claim 42, wherein the voice controlled device is a GSM mobile telephone.

45. The method of claim 13, wherein the method is implemented in a mobile telephone including a memory, and wherein the step of selecting the telephone number comprises selecting the telephone number from a plurality of sub-identifiers uttered in any order by a voice command, the plurality of sub-identifiers including said sub-identifier matching one of the sub-identifiers stored in the memory.

46. The method of claim 45, wherein the step of selecting the telephone number ignores words in the voice command that do not match any of the sub-identifiers stored in the memory.

* * * * *